(12) United States Patent
Fenn

(10) Patent No.: US 7,572,987 B2
(45) Date of Patent: Aug. 11, 2009

(54) DIAL TRACKER SCALE

(76) Inventor: Doreen Fenn, 9 Center St., Netcong, NJ (US) 07857

( * ) Notice: Subject to any disclaimer, the term of this patent is extended or adjusted under 35 U.S.C. 154(b) by 195 days.

(21) Appl. No.: 11/799,900

(22) Filed: May 3, 2007

(65) Prior Publication Data
US 2008/0272198 A1 Nov. 6, 2008

(51) Int. Cl.
*G06K 7/00* (2006.01)
*G01G 19/36* (2006.01)
*G01G 19/40* (2006.01)
*G01G 19/04* (2006.01)

(52) U.S. Cl. .................. 177/85; 177/25.11; 177/25.19; 177/34

(58) Field of Classification Search ............... 235/85 R, 235/85; 177/34
See application file for complete search history.

(56) References Cited

U.S. PATENT DOCUMENTS

| | | | |
|---|---|---|---|
| 1,124,100 A | 1/1915 | Baker et al. .................. 40/495 |
| 1,235,826 A | 8/1917 | McKean et al. ............... 40/495 |
| 1,380,227 A | 5/1921 | McGlothlen ................. 40/495 |
| 1,681,740 A | 8/1928 | Meyers ........................ 40/495 |
| 2,252,487 A | 8/1941 | Bevill .......................... 116/308 |
| 2,748,514 A | 6/1956 | Sulger ......................... 40/495 |
| 3,433,407 A | 3/1969 | Carter ......................... 235/138 |
| 3,493,172 A | 2/1970 | Bromage ..................... 235/114 |
| 3,572,585 A | 3/1971 | Weaver ........................ 235/88 |
| 4,258,812 A * | 3/1981 | Pfeiffer ................... 177/210 R |
| 4,318,447 A * | 3/1982 | Northcutt .................. 177/25.19 |
| 4,492,580 A | 1/1985 | Sabel .......................... 434/127 |
| 4,576,244 A | 3/1986 | Zeigner et al. .............. 177/245 |
| 4,599,508 A | 7/1986 | Smetaniuk ................... 235/116 |
| 4,958,454 A | 9/1990 | Chan et al. ..................... 40/495 |
| 5,640,774 A | 6/1997 | Goldman ....................... 33/15 |
| 5,673,691 A | 10/1997 | Abrams et al. ............. 128/630 |
| 6,376,783 B1 * | 4/2002 | Vaghi ...................... 177/25.15 |
| 6,617,530 B1 | 9/2003 | Lin .......................... 177/25.16 |
| 6,635,015 B2 | 10/2003 | Sagel .......................... 600/300 |
| 2002/0074792 A1 | 6/2002 | Newell .......................... 283/2 |
| 2005/0004436 A1 | 1/2005 | Nissila et al. ............... 600/300 |
| 2005/0058970 A1 | 3/2005 | Perlman et al. ............. 434/127 |

* cited by examiner

*Primary Examiner*—Tung S Lau
*Assistant Examiner*—Laura Gudorf
(74) *Attorney, Agent, or Firm*—Ernest D. Buff & Associates; Ernest D. Buff

(57) ABSTRACT

A portable, pocket-sized weight loss Dial Tracker Scale has adjustable settings for indicating current weight, goal weight and weight loss/weight gain. The Dial Tracker Scale has insignia, business logos and motivational statements to encourage weight loss behavior. The Dial Tracker Scale may be a mechanical device requiring no battery power. Alternatively, the Dial Tracker Scale may be a battery powered electronic device with enhanced functions such as remote wireless communication with a special bathroom floor scale or computer web program adapted to interface with a Dial Tracker Scale Web Site to tabulate or graphically display weight loss or weight gain. In addition, the electronic scale has the ability to download its image into a cell phone where weight indications are changeable with volume, pound and star type buttons.

10 Claims, 6 Drawing Sheets

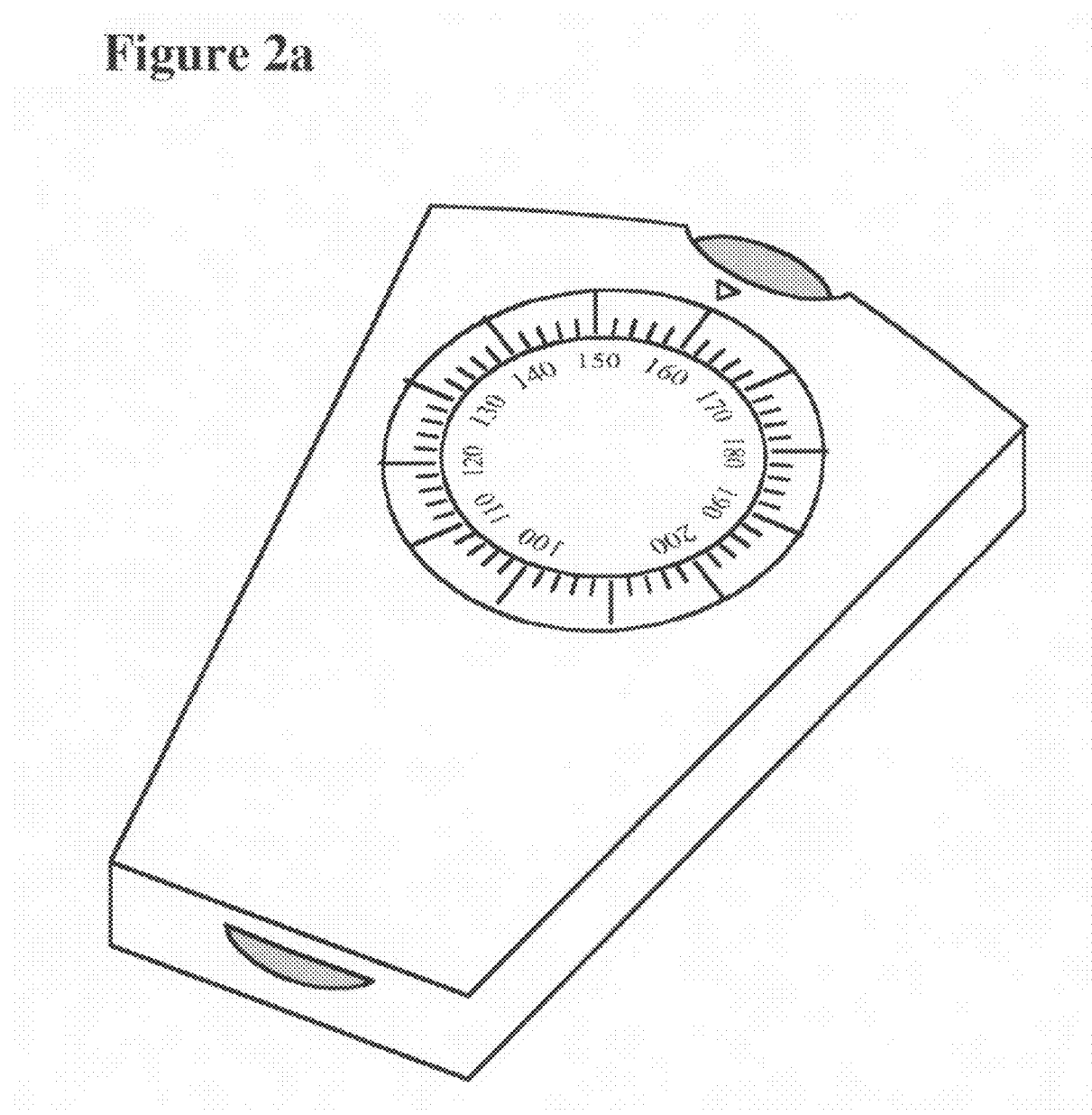

DIAL TRACKER SCALE

BACKGROUND OF THE INVENTION

1. Field of the Invention

The present invention relates to weight control; and, more specifically, to a compact, lightweight, portable device that tracks the current weight of a person against their desired weight, and displays the amount of weight lost, providing motivation for progress with continued weight loss.

2. Description of the Prior Art

Devices for weighing persons and devices for recording weights are known in the prior art. These devices are cumbersome and heavy and are generally not portable. They contain additional computer based features such as diet or exercise recommendations, and do not provide a clear indication of weight loss at any desired time.

U.S. Pat. No. 1,124,100 to Baker et al. discloses an indicator for recording weight of a truck, car or vehicle together with the date on which the vehicle was weighed. No means are provided for keeping track of the current weight of a person, together with the goal weight of a person, and determining the weight gained or lost.

U.S. Pat. No. 1,235,826 to McKean discloses a changeable exhibitor. This indicator is operative to record the weight of a car or vehicle, together with the state where it was weighed and the date on which it was weighed. This device does not keep track of the current weight of a person. No means are disclosed for tracking the goal weight of a person or for determining the weight gained or lost.

U.S. Pat. No. 1,380,227 to McGlothlen discloses an indicator. The unloaded tare weight of freight cars or auto trucks is indicated. Knowledge of tare weight prevents overloading of the vehicle beyond its safe values. The weigh master seals the measured tare weight and cannot be altered without the use of a security card. This indicator does not record the current weight of a person. It does not record the person's goal weight and or compute and display the pounds lost or gained.

U.S. Pat. No. 1,681,740 to Meyers discloses a device for computing underwear sizes. This two-sided device has one side for selecting the chest, waist and trunk sizes of a person, while the opposite side displays the size of the undergarment. No disclosure or suggestion is contained within the '740 patent concerning a method and means for tracking the current weight, goal weight and pounds lost of a person.

U.S. Pat. No. 2,252,487 to Bevill discloses a time recorder and key holder. Three thumb wheels in the key holder are turned to set the time at which the automobile is parked in front of a parking meter. No disclosure or suggestion is contained by the '487 patent concerning a method or means of keeping track of person's current weight, goal weight and pounds lost.

U.S. Pat. No. 2,748,514 to Sulger discloses an indicator. This indicator is adapted to keep track of total calories consumed. The indicator has two wheels placed above each. One wheel has a window while the other wheel has numbers in increments of 100 printed. The user advances the printed wheel by one notch to indicate through the window total calories so far consumed. The presence of the notch prevents free rotation of the printed wheel, and the number of calories consumed is maintained until the user turns the printed wheel again. This indicator merely keeps track of calories consumed as increments of 100 calories. No disclosure is contained by the '514 patent concerning a method and means for keeping track of a person's current weight, goal weight and pounds lost.

U.S. Pat. No. 3,433,407 to Carter discloses a weight control aid. The user selects calories consumed during each meal by rotating two control wheels which, in turn, move two films. The total calories consumed in each day are recorded by the user on a line in a sheet. The device is illuminated by a flashlight. No disclosure is contained within the '407 patent for keeping track of the current weight, goal weight and pounds lost of a user.

U.S. Pat. No. 3,493,172 to Bromage discloses a counting device. This counting device is provided with a casing and is a finger operated plunger device. First and second rotatably mounted display wheels have graduated scales. The two wheels are connected through a ratcheting mechanism. The device has three wheels, which are ratcheted. When the plunger is pressed, the first wheel advances by one tooth incrementing the number displayed in a window of the casing that views the first wheel. Thus, the first window displays the number of times the plunger is pressed. The other two wheels are also ratcheted and the wheels move a manner that decrements the display from a preset value corresponding to plunger activation. No disclosure is contained within the '172 patent concerning a method and means for keeping track of current weight, goal weight or indicating the pounds lost by the user.

U.S. Pat. No. 3,572,585 to Weaver discloses a weight reduction calculator. This calculator takes into account male or female, age, weight and height. It calculates basic total calorie need with no activity and provides total caloric need for various levels of activity that would result in no weight loss. The physician recommended caloric intake is subtracted from this total caloric need and represented as a calorie deficit. At this caloric restriction level, the calculator shows the number of days needed for a diet appointed to achieve a specified weight loss. This is merely a calculator, which incorporates data commonly available in tables. A weight loss of 1 pound typically needs a total deficit of 4086 calories. It does not provide a recommendation of a reduced calorie diet, but looks for recommendations from a physician. No disclosure is contained within the '585 patent concerning a method and means for keeping track of current weight, goal weight or pounds lost by a user.

U.S. Pat. No. 4,492,580 to Sabel discloses a weight-loss motivation kit. This device is for motivating dieters to maintain a program for weight loss. A planar board has foldable support portions and printed indicia with a plurality of spaces designating progressively the number of pounds that a dieter wishes to lose during a weight loss program. When a dieter commences a weight-reduction program, a number of cartons equaling the number of pounds to be lost are stacked against the indicia of the board to coincide with the designated spaces. For each pound that the dieter loses, he or she is entitled to remove one carton, unfold it and place it in a flat carton holder in the rear of the board. This is a motivational weight reduction kit wherein the user folds away one of the cardboard blocks indicating that the user has lost a pound of weight. When all the cardboard blocks are folded, indicating the user has lost the planned weight, the board displays that the user has reached the weight goal. This is merely a display device indicating the progression of weight loss. The motivational kit does not keep track of the current weight of the user or indicate the goal weight of the user. It also does not indicate pounds lost at any time by the user.

U.S. Pat. No. 4,576,244 to Zeigner et al. discloses a dieter's weighing scale. This dieter's weighing scale is a talking electronic scale for encouraging the use of and adherence to a preset diet program. A user on the scale actuates a mechanism whose movement is transformed to electrical pulses to provide a digital readout of his present weight on a display. A microprocessor provides an electronic memory for storing a goal weight for the person and his weight each time he is weighed, along with the date of each stored weight as well as a series of comments to be voiced. The microprocessor also compares the goal weight with the present weight to actuate a voice synthesis device connected to the microprocessor to provide preselected comments appropriate to the comparison. An audio device connected to the voice synthesis device provides comments to be audibly spoken to the user. This weighing scale remembers the goal weight desired by the user and provides appropriate voice synthesized comments based on the measured weight of the user to encourage the user to stay on the diet program. This is a measuring scale, which is bulky and is not carried in the pocket of the user. It does not indicate to the user at all times the current weight, the goal weight and pounds lost from the time the user begins to track the progress of weight lost.

U.S. Pat. No. 4,599,508 to Smetaniuk discloses a calorie counter. This calorie counter is designed for persons wishing to control their weight. The calorie counter has a housing with a base and a transparent cover rotatably mounted to the base. An opaque partition is located in the housing parallel to the cover. This partition has three circular calorie counting scales. The partition consists of an inner disk having first and second calorie counting scales and an annular disk, which is an outward extension of the inner disk. The annular disk is rotatable and protrudes through a side wall of the base at one location. Two line indicators are provided by two transparent disks located between the cover and the annular partition. The first indicator points to the number of calories contained in a food item while the second indicator points to the total number of calories consumed by the user during a set time period. A gear mechanism operated by a thumb wheel operates both indicator disks at the same time. The user turns a wheel to record calories consumed in a meal. This also turns two indicators. When the user turns the first wheel again for the next meal, this calorie addition is recorded by the indicator. The calorie counter merely counts the number of calories consumed in each meal and the total number of calories consumed in a day. It does not keep track of the current weight of the user, the goal weight of the user or the pounds lost from the time the user begins to keep track of weight loss or gain.

U.S. Pat. No. 4,958,454 to Chan et al. discloses a data recorder. This information recording device contains a body having the form of a thin plate with at least one, and preferably three wheels. The portable recorder has a key chain and comprises an alpha wheel, numeric wheel and a color wheel adapted for recording a parking location, etc. This data recorder does not keep track of the user's current weight or weight goal. No method and means are disclosed therein for calculating the pounds lost from the time the user has decided to keep track of weight loss.

U.S. Pat. No. 5,640,774 to Goldman discloses a diet aid device and method. This diet aid device includes an apparatus to indicate a net calorie intake goal, remaining calories to reach the goal; and an indication to cause decrease in the intake of the remaining calories to reach the goal as calories are consumed. The diet aid device first sets the desired caloric goal per day and decrements remaining calories as calories are consumed. Exercise or expended calories correspondingly are input to increase the calories remaining. As the calorie goal is approached, the color change in the calories-remaining warns the user to go slowly with the further consumption of calories. This calorie counter does not keep track of the user's current weight, weight goal or pounds lost from the time the user decides to keep track of weight loss.

U.S. Pat. No. 5,673,691 to Abrams et al. discloses an apparatus to control diet and weight using human behavior modification techniques. The hand-held computer prepares and monitors a goal-oriented weight, nutrition and exercise control program. Visual and audio prompts tell users when to eat and exercise, and provide suggestions for what to eat. This system analyzes the user's behavioral patterns of eating and exercise and suggests modifications to the behavior. It provides positive and negative feedback to the user based on behavior inputs. This behavior monitoring and behavior modification system does not track the current weight or goal weight of a user. It also does not provide information to the user about the weight loss or weight gain from the time the user has decided to track weight loss/gain.

U.S. Pat. No. 6,617,530 to Lin discloses a scale with use reminder and weight change messages. The scale portion includes a display for registering the weight of the person standing thereon. The scale prompts the user to weigh himself at a pre-selected time in the form of a voice message alarm. The scale stores the previous day's weight and compares it with the present day weight, then displays the current weight and weight difference. If the user has lost weight, the voice message congratulates the user. Otherwise, the voice message provides encouraging remarks. First, the scale is a heavy weighing device and cannot be carried in the pocket of a user. The scale only compares weight on a day to day basis, but does not track weight change or pounds lost from the time the user decides to track weight change.

U.S. Pat. No. 6,635,015 to Sagel discloses a body weight management system. This system is managed by a provider that provides to the user recommendations of food and satiety compositions. The system monitors the food and satiety consumption by the use and records energy expended and generates additional recommendations. This system is not a portable device and does not track user's current weight, goal weight and pounds lost from the time user has decided to monitor weight loss.

U.S. Published Patent Application No. 2002/0074792 to Newell discloses a calendar kit and apparatus for behavior modification and a method for using the same. This calendar kit records manual data that relates to the user on individual sheets. Space is provided for collecting daily, weekly or monthly data to record the progress of the user. This is a recording system, not a portable device that records the user's current weight, weight goal and pounds lost or gained from the time the user decided to track weight gain/weight loss patterns.

U.S. Published Patent Application No. 2005/0004436 to Nissila et al. discloses a method and device for the weight management of humans. The device initially collects the user's initial weight and weight goal and recommends food intake and exercise routines based on sex, age, height, weight, etc. The system monitors user input of food intake and exercise routines, computes actual weight loss against expected weight loss and corrects further recommendations accordingly. The '436 patent application does not disclose a portable device carried by the user. Rather it is a stationary device comprising a complex set of instructions and recommendations.

U.S. Published Patent Application No. 2005/0058970 to Permian et al discloses a behavior modification aide. This behavior modification aide includes a user-modifiable BMI (body mass index) goal, weight goal, a display for displaying messages dependent upon the daily eating schedule and exercise schedule and the number of times the user-initiated habit-occurrence indicator is used. An overall visual indication is presented indicating the degree to which the user is maintaining the eating and exercise schedule. This device is watch-like with six buttons. Buttons 1 through 4 have conventional watch-like functionality while buttons 5 and 6 provide behavioral modification functionality. The watch-like device accepts food intake, exercise routines and provides an indication of how the user is striving to attain his weight goals. This device does not simultaneously display current weight, goal weight and pounds lost from the time the user decided to track weight change. It is a complicated device with multiple features providing an unfriendly user environment.

Notwithstanding the efforts of prior art workers to construct a weight loss monitoring device, there exists a need for an unobtrusive attractive portable device that monitors current weight against a previously set goal weight indicating cumulatively the progress of weight loss or gain.

SUMMARY OF THE INVENTION

The present invention provides a handheld portable device that displays the current weight of a person, weight lost or gained (referred to hereinafter in the specification and claims as "weight lost") and the goal weight. The device also has motivational statements and logos of weight loss supporting organizations and the like. This portable weight loss monitoring device may be a mechanical non-electronic device or a battery powered electronic device.

Generally stated, the invention comprises a handheld device appointed for tracking a person's current weight, goal weight and pounds lost. The Dial Tracker Scale comprises (i) a container; (ii) a current weight indicator; (iii) a goal weight indicator; and (iv) a pounds lost indicator. The current weight, goal weight and pounds lost are set by the user. The user may at any time change any weight indicator. The Dial Tracker Scale displays the current weight, goal weight and pounds lost all the time so that the user can observe progress toward reaching his or her desired goals.

The Dial Tracker Scale is a handheld device that may be a mechanical non-electronic device or, alternatively, an electronic device. In this embodiment, the mechanical non-electronic device measures about 2" by 2.75" in size, and fits easily into most clothing pockets. Unlike the millions of electronic "pocket gadgets" that are currently in use, the mechanical version of the Dial Tracker does not require any batteries. The Dial Tracker Scale has 3 dials that are adapted to be moved by the user to track the user's current weight, goal weight and pounds lost. Each dial is moved with the user's fingertip. When the dial moves, the dial produces a "clicking" sound. All the dials are locked in place until the dial is moved again by the user.

The second embodiment of the invention includes an electronic version of the Dial Tracker Scale. The device is approximately 2" by 2.75" and is easily carried in a pocket. The device is powered by a battery and has three preferably LCD displays indicating the current weight, goal weight and the pounds lost. The user controls the weight indications by moving the up and down recessed buttons located next to the current weight, goal weight and pounds lost indicators.

In an optional embodiment, the electronic version of the Dial Tracker Scale receives the current weight from a special bathroom floor scale that communicates with the hand held electronic Dial Tracker Scale using infrared communication or radio frequency communication. The electronic Dial Tracker Scale may communicate with a computer to interface with a Dial Tracker web page which has an appearance to the hand held Dial Tracker Scale, but maintains computer communication time data so that weight loss or weight gain as a function of time may be electronically plotted and provided to the user. The Dial Tracker Scale also downloads to a cell phone with a color screen. The Dial Tracker Scale would now appear on the phone screen. Symbols such as the star and pound buttons on the phone would enable the user to change the numbers on the current weight, goal weight and pounds lost.

Advantageously, the Dial Tracker Scale is tailored for use in the weight loss field. As such, it is especially well suited for use by persons that are overweight or weight conscious, and are looking for ways to lose weight. Other goals can be achieved through use of the Dial Tracker Scale, such as weight gaining or muscle building. The Dial Tracker Scale can be used by body builders, recovering anorexia patients or those in the general population interested in tracking their weight gain or loss. The Dial Tracker Scale is like a calculator or diary or "wish-list" for those needing to track their present weight, goal weight and pounds lost. The Dial Tracker Scale can be sold to drug companies who promote medications for diseases associated with being overweight, namely, such diseases as diabetes, heart disease, and high blood pressure. The Dial Tracker Scale gives people a sense of control over their weight loss. The Dial Tracker Scale will help people to stay focused on their weight loss goals.

BRIEF DESCRIPTION OF THE DRAWINGS

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
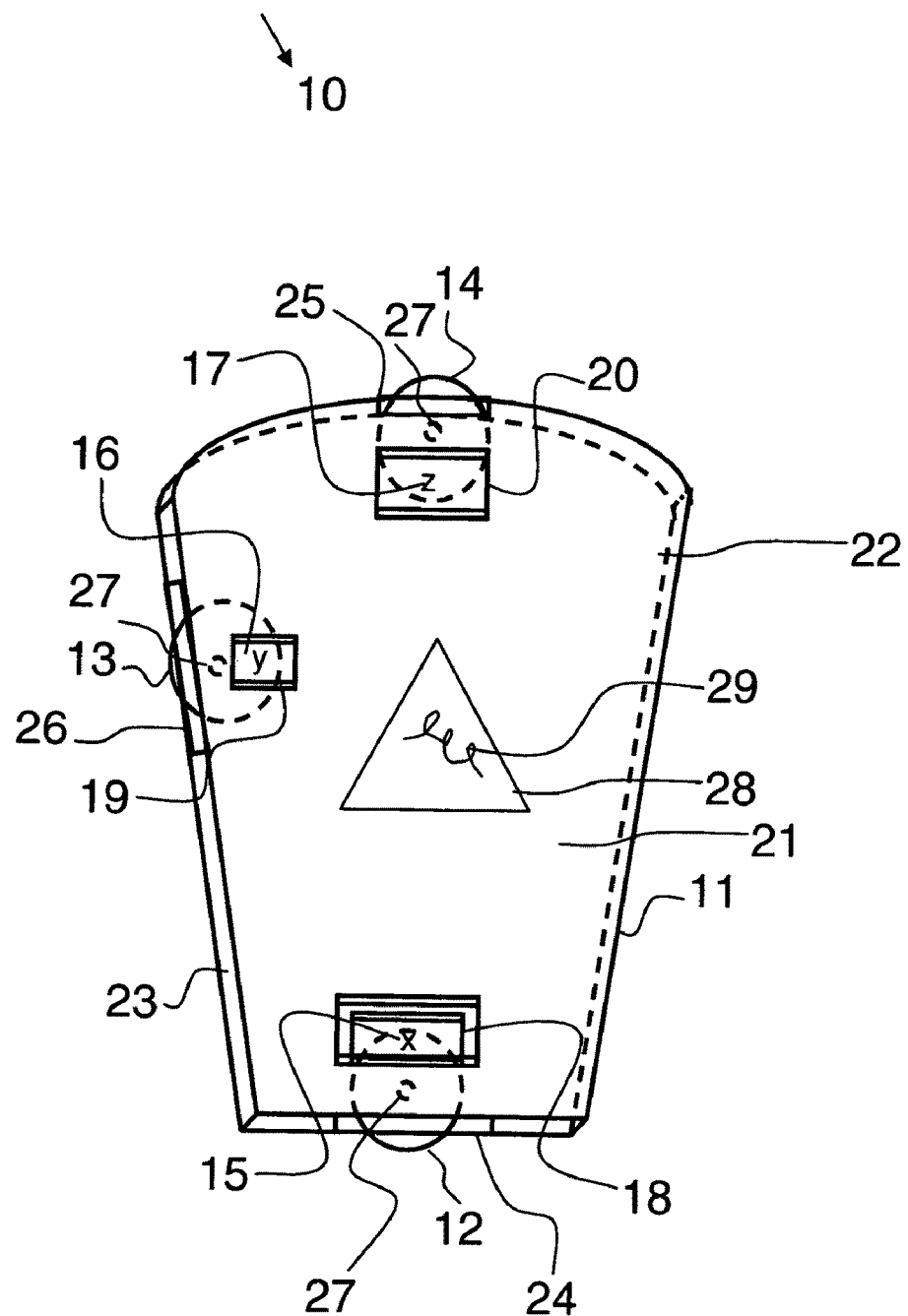
FIG. 1 is a schematic diagram of a mechanical version of the Dial Tracker Scale according to the first embodiment of the invention.

This invention relates to a handheld device appointed for tracking a person's current weight, goal weight, and pounds lost. The Dial Tracker Scale comprises: (i) a container; (ii) a current weight indicator; (iii) a goal weight indicator; and (iv) a pounds lost indicator. The current weight, goal weight and pounds lost are set by the user. The user may at any time move any weight indicator. The Dial Tracker Scale displays the current weight, goal weight and pounds lost all the time so that the user can observe progress made toward reaching the goal or simply move the numbers to get motivated.

The Dial Tracker Scale is a non-electronic device with ratcheted thumb wheels provided for the current weight, goal weight and pounds lost indications. The ratcheted thumb wheel prevents accidental alteration of these indications when the Dial Tracker Scale is carried in a pocket or purse or from a keychain or wristband (at the gym). The mechanical version of the Dial Tracker Scale requires no batteries or powering means. The user sets the goal weight, current weight and pounds lost by adjusting the ratcheted thumb wheels.

The electronic version of the Dial Tracker Scale has the same three indications of current weight, goal weight and pounds lost. The electronic version of the Dial Tracker Scale is battery powered and has a microprocessor adapted to perform computational calculations. The current weight, goal weight and pounds lost indicators are provided with two recessed buttons, each marked 'up arrow' and 'down arrow' to increase and decrease the weight indication.

Generally stated, the Dial Tracker Scale is a portable device that monitors and displays weight loss, current weight and desired goal weight. The Dial Tracker is non-electronic in nature. This device requires no batteries and ratcheted thumb wheels provide the security that the numbers set will not be altered during transportation of the pocket sized Dial Tracker Scale. The user is immediately able to set the information of his current weight, goal weight and pounds lost from the time the user decided to track his or her weight. In an alternative embodiment, the Dial Tracker Scale may be electronic. In the electronic embodiment, three indicator screens display the current weight, goal weight and pounds lost. The current weight, goal weight and pounds lost may be changed by pressing the 'up arrow' or 'down arrow' recessed buttons. Optionally, the weight loss data displayed on the Dial Tracker Scale may be computerized by way of a Dial Tracker web site. The web site screen would be similar to a live version of the electronic Dial Tracker product. By using the up and down arrow keys on a computer keyboard, the current weight, goal weight and pounds lost weight indications in the web site screen, the user can adjust the current weight, goal weight and pounds lost numbers on the Dial Tracker Scale computer screen. The web site captures the time and day, the current weight, goal weight and pounds lost so that a chart can be generated that tracks the weight loss or weight gain progression of the user.

The computer screen in the Dial Tracker may be downloaded into a cellular phone so that a user could press their phone buttons (such as volume, star and pound keys) to adjust the current weight, goal weight and pounds lost indicators. In another embodiment, the electronic version of the Dial Tracker may receive current weight information from a specially designed bathroom floor scale. This communication may be an infrared communication or a radio frequency communication. With this embodiment, the user can place the electronic version of the Dial Tracker Scale in close proximity Oust at arm's length over the bathroom floor scale), whereupon the electronic version of the Dial Tracker Scale scans the user's weight off the specially designed bathroom floor scale into the hand-held Dial Tracker Scale.

FIG. 1 is a schematic view illustrating generally a mechanical version of the Dial Tracker Scale. The scale is shown having in general the shape of a traditional, miniaturized, bathroom scale. The scale can come in various shapes, and is small enough in size to be carried on a person's clothing, in a pocket, bag or used as a keychain. It could also be attached to a wristband for use at the gym. The scale has a top surface 21, a bottom surface 22, and sides 23. Sides 23 have at least three apertures at 24, 25 and 26 respectively. The indicator wheels, 12, 13 and 14 are configured as dials with numerals printed therein which show through windows 15, 16 and 17 respectively. All the indicator wheels have a pin shown at 27 in the center thereof, so that each of the indicators is adapted to pivot and lock in place when the user's desired information, is entered into window 15 (weight is lined up under red bar) and also into windows 16 and 17.

Figure 2B:
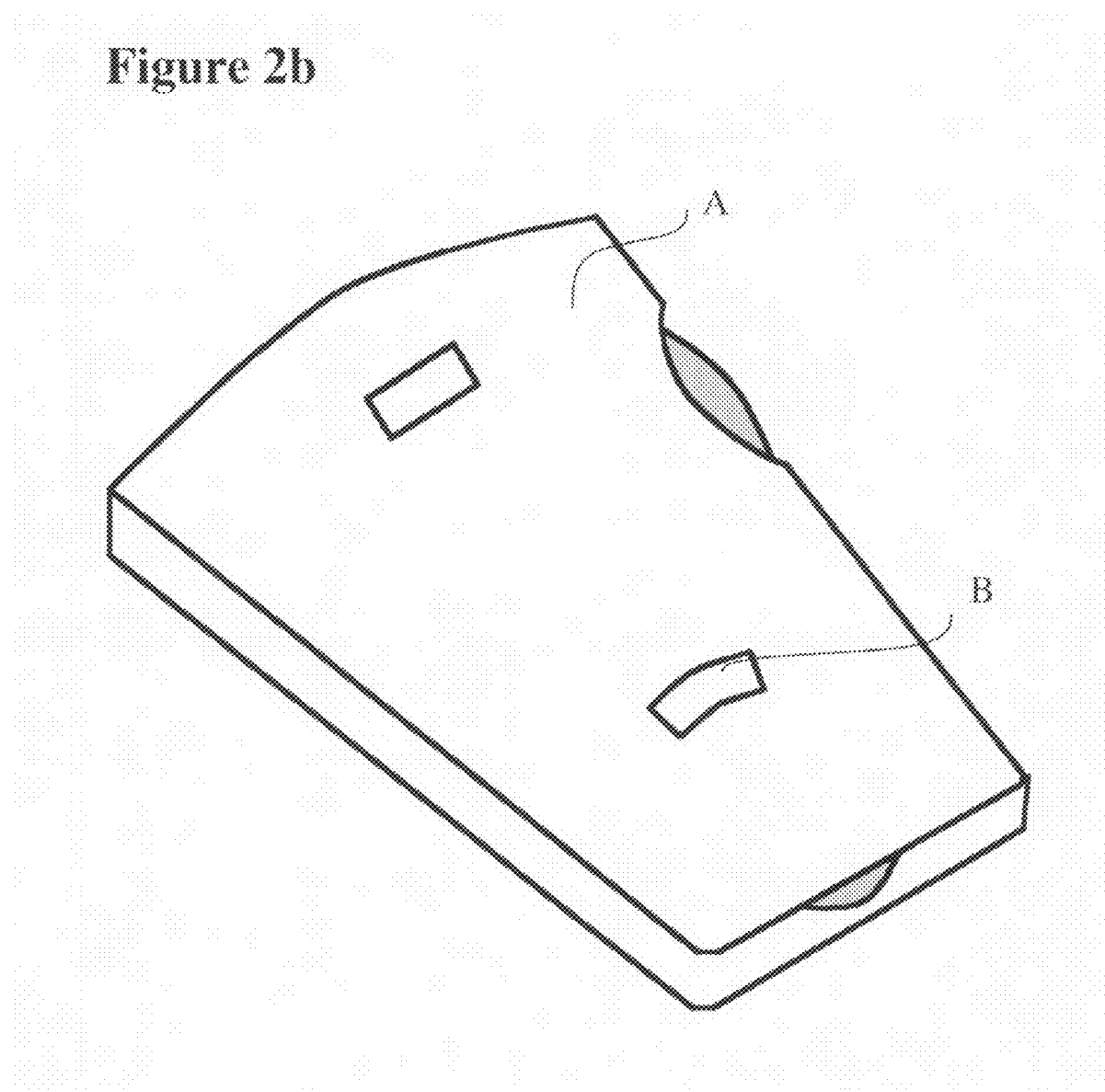
FIG. 2 is a color illustration of the front and back of the mechanical version of the Dial Tracker Scale.

FIG. 2 is an illustration that shows the outside container for FIG. 1. There are three separate dial areas, representing the current weight, goal weight and weight loss. The front dial is moved until the desired weight is under the red pointer. The goal weight and pounds lost wheels are housed on the back of the Dial Tracker Scale. The desired numbers are adjusted until they appear in windows A and B for goal weight and pounds lost respectively.

Figure 3:
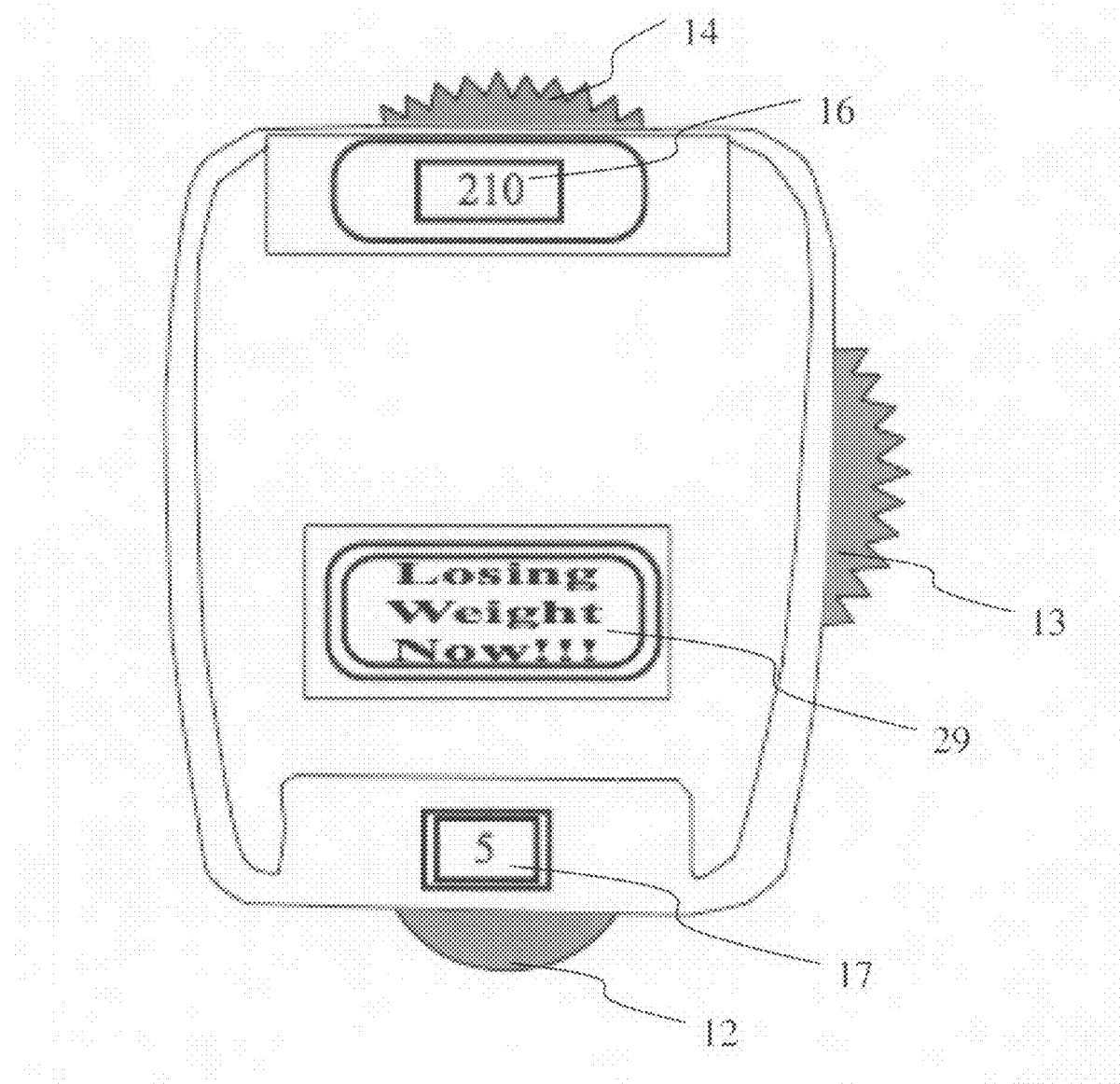
FIG. 3 is a photograph of the back of the mechanical version of the Dial Tracker Scale illustrating the goal weight and pounds lost windows, along with an encouraging message (that is interchangeable) and that may be attached to the Dial Tracker Scale in a message area.
Figure 4:
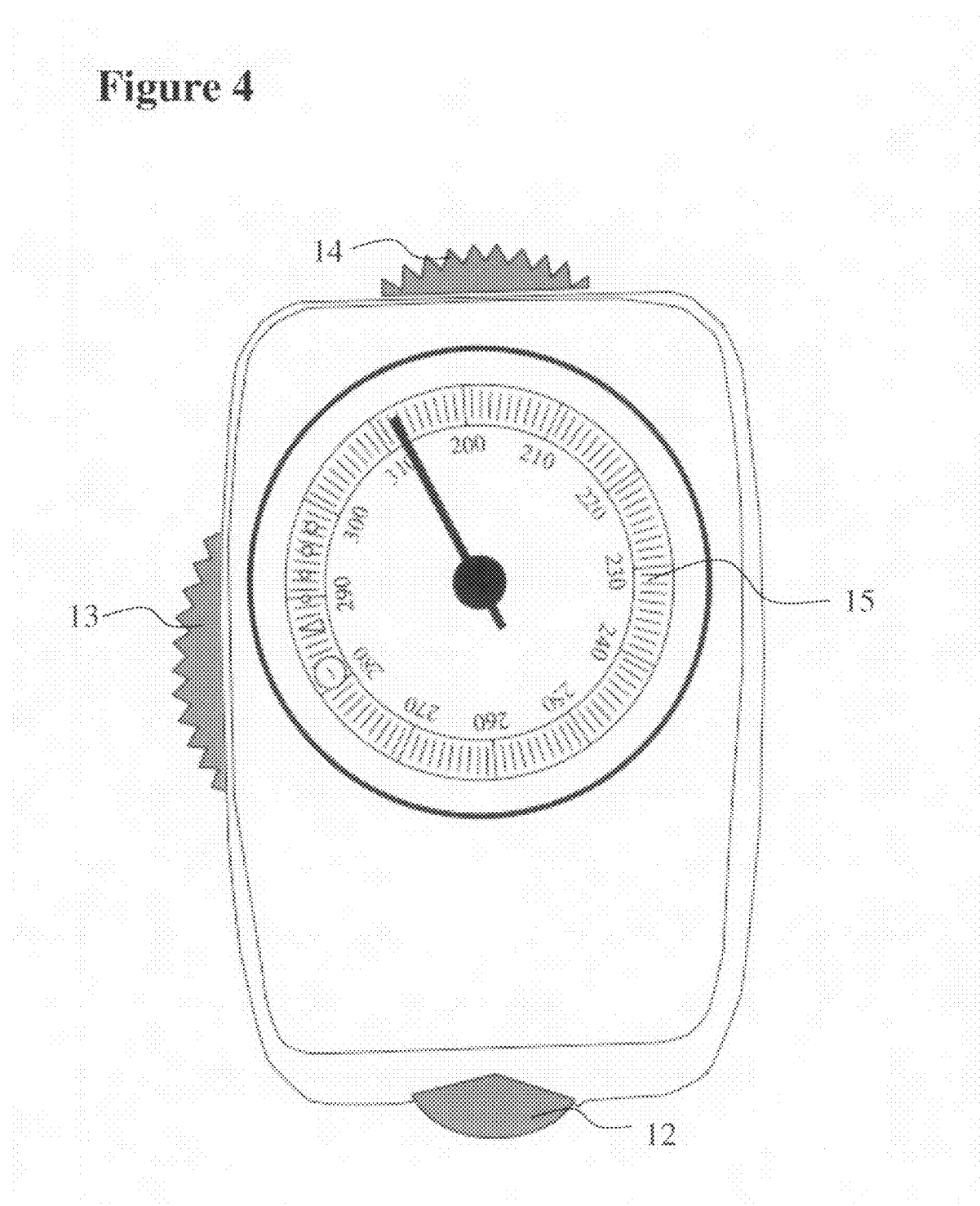
FIG. 4 is a photograph of the front of the mechanical version of the Dial Tracker Scale illustrating the current weight and exposed wheels on the device.

FIGS. 3 and 4 are photographs illustrating the Dial Tracker Scale with current weight (FIG. 4) and goal weight and pounds lost indicators respectively (FIG. 3). FIG. 3 shows at 29 a sample message that may be replaceably affixed to the message area of the Dial Tracker Scale to motivate the user to continue the weight loss efforts. The Dial Tracker Scale can further include indicia 29, such as motivational sayings, or advertisements.

Figure 5:
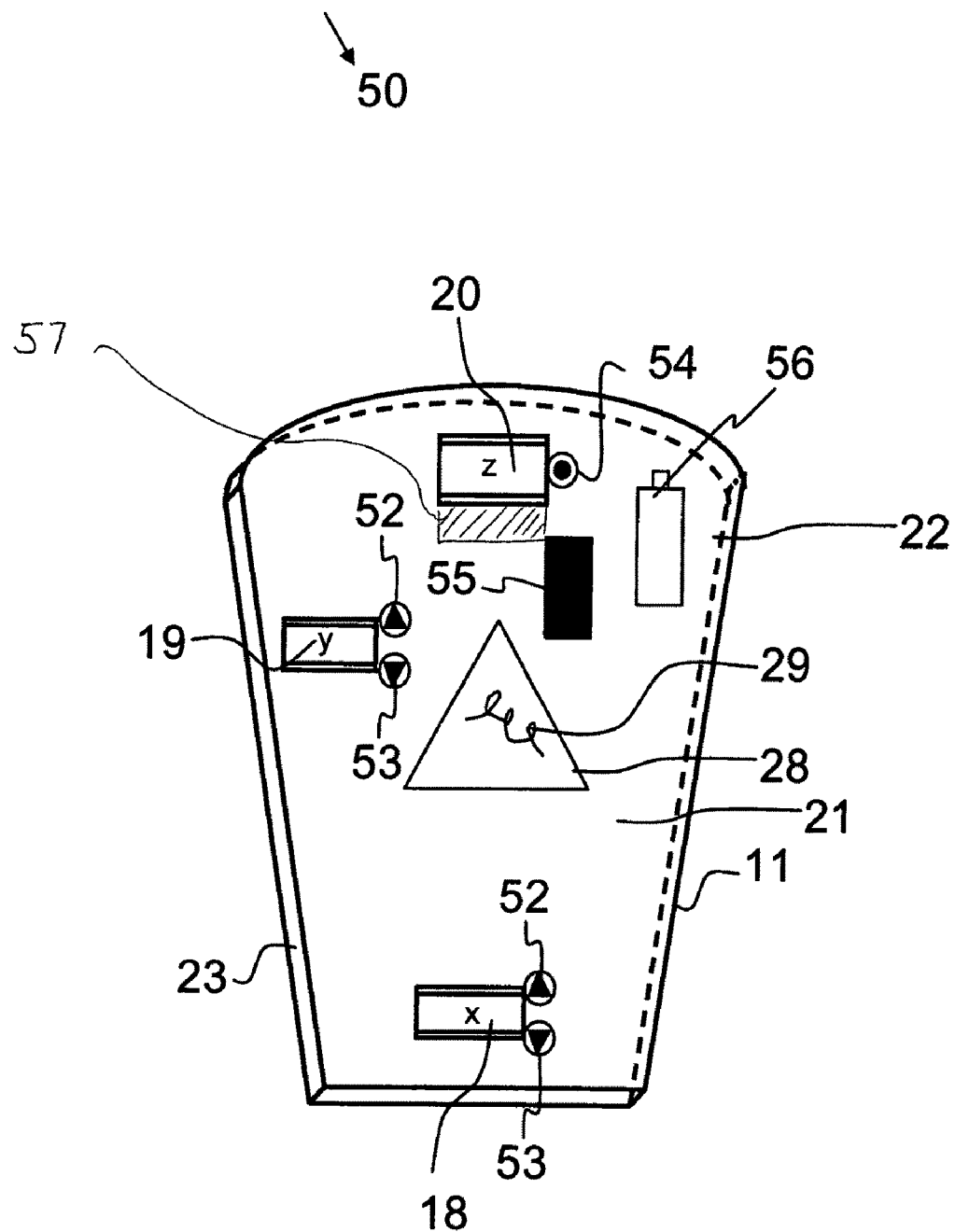
FIG. 5 is a schematic illustration of the electronic version of the Dial Tracker Scale showing current weight, goal weight and weight loss indications along with a scanning screen.

FIG. 5 illustrates generally at 50 a schematic view of the electronic version of the Dial Tracker Scale. As shown, the Dial Tracker Scale has generally the shape of a traditional, miniaturized, bathroom scale. The scale can come in various shapes, and is small enough in size to be carried on a person's clothing, in a pocket, or in a purse, bag, keychain or wristband. The scale has a top surface 21, a bottom surface 22, and sides 23. A current weight indicator 18, a goal weight indicator 19, and a pounds lost indicator 20, are housed in the upper surface 21 of the scale. The indicators, 18, 19, and 20, are configured as digital LCD displays, shown as x, y, and z, respectively. The settings in current weight indicator 18 and goal weight indicator 19 can be changed by a recessed up arrow button 52 and a recessed down arrow button 53, as shown. The electronic Dial Tracker Scale has a microprocessor 55 and is powered by battery at 56. At 57, a scanning screen can read the current weight off a specialized bathroom floor scale by holding the Dial Tracker handheld device directly over the floor scale at arm's length.

The key components of the Dial Tracker Scale include, in combination, the features set forth below:

1. The Dial Tracker Scale is set when the user sets the current weight, goal weight and pounds lost indicators.

2. In the mechanical version of the Dial Tracker Scale, the current weight, goal weight and pounds lost indicators are locked by a ratchet thumb wheel and remain constant when the portable Dial Tracker Scale is carried in a pocket, handbag or as a keychain or (wristband for the gym).

3. The current weight, goal weight and weight lost in the mechanical version of the Dial Tracker Scale is accomplished by moving the dials to the number that the user wants. This requires no battery power.

4. The battery powered electronic version of the Dial Tracker Scale has up and down recessed buttons provided for current weight, goal weight and for the pounds lost indicator.

5. Optionally, the electronic version of the Dial Tracker Scale may receive current weight remotely by infrared or radio communication from the specially designed bathroom floor weight scale.

6. Optionally a web site may be provided with an updateable image that matches the electronic version of the Dial Tracker Scale, indicating to the user the current weight, goal weight and pounds lost. The web site may track the pounds lost as a function of time and provide a display chart of weight loss progression as a function of time. The image of a Dial Tracker Scale displaying the current weight, goal weight and pounds lost may be downloaded to a cell phone from the scale.

7. The current weight, goal weight and pounds lost dials are readily changed by the user, giving the user full control over their need to control the numbers.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A portable, pocket-sized weight loss Dial Tracker Scale, comprising:
   a. a settable indicator for displaying current weight;
   b. a settable indicator for displaying goal weight;
   c. a settable indicator for displaying pounds lost/or gained;
   whereby a user of said portable weight loss indicator is provided at all times with a visual display of current weight, goal weight and weight lost; and
   d. said Dial Tracker Scale having a physical dimension ranging from 2" wide by 2.75" long and thereby adapted to be carried in a shirt, coat, or pants pocket, or in a handbag, gym bag or used as a keychain or wristband for the gym.

2. A portable, pocket-sized weight loss Dial Tracker Scale as recited by claim 1, wherein said weight loss Dial Tracker Scale is a mechanical device, and the three indicators are provided with corresponding wheels for manually setting current weight, goal weight and weight loss/gain.

3. A portable, pocket-sized weight loss Dial Tracker Scale as recited by claim 1, wherein said weight loss Dial Tracker Scale is a battery powered, electronic device with said three indicators and up and down controls for manually setting current weight, goal weight and pounds lost.

4. A portable, pocket-sized weight loss Dial Tracker Scale as recited by claim 3, wherein said weight loss/gain indication is updated by a microprocessor resident in said electronic Dial Tracker Scale.

5. A portable, pocket-sized weight loss Dial Tracker Scale as recited by claim 3, wherein said electronic Dial Tracker Scale receives current weight data from a specially designed bathroom floor scale by wireless communication.

6. A portable, pocket-sized weight loss Dial Tracker Scale as recited by claim 5, wherein said wireless communication is infrared communication.

7. A portable, pocket-sized weight loss Dial Tracker Scale as recited by claim 5, wherein said wireless communication is radio frequency communication.

8. A portable, pocket-sized weight loss Dial Tracker Scale as recited by claim 3, wherein said electronic Dial Tracker Scale communicates with a computer connected to a Dial Tracker Scale Web Page updating current weight and registering time of computer interface connection providing current weight as a function of time in a table or graphical format.

9. A portable, pocket-sized weight loss Dial Tracker Scale as recited by claim 1, wherein said Dial Tracker Scale has a location provided for motivational statements, business logos and advertisements.

10. A portable, pocket-sized weight loss Dial Tracker Scale, comprising:
    a. a settable indicator for displaying current weight;
    b. a settable indicator for displaying goal weight;
    c. a settable indicator for displaying pounds lost/or gained;
    whereby a user of said portable weight loss indicator is provided at all times with a visual display of current weight, goal weight and weight lost; and
    d. said weight loss Dial Tracker Scale being a battery powered, electronic device with said settable indicators and up and down controls for manually setting current weight, goal weight and pounds lost, and communicating with a computer connected to a Dial Tracker Scale Web Page updating current weight and registering time of computer interface connection, to provide current weight as a function of time in a table or graphical format.

* * * * *